US012344508B2

(12) United States Patent
Kinnari et al.

(10) Patent No.: US 12,344,508 B2
(45) Date of Patent: Jul. 1, 2025

(54) SYSTEM AND A METHOD FOR DETECTING AN OUT-OF-OPERATION STATE OF AN ELEVATOR SYSTEM BASED ON CONTROL BUS TRAFFIC (71) Applicant: KONE Corporation, Helsinki (FI)

(72) Inventors: Jouko Kinnari, Helsinki (FI); Olli Mali, Helsinki (FI); Matti Laakso, Helsinki (FI)

(73) Assignee: KONE CORPORATION, Helsinki (FI)

(*) Notice: Subject to any disclaimer, the term of this patent is extended or adjusted under 35 U.S.C. 154(b) by 1302 days.

(21) Appl. No.: 17/065,916

(22) Filed: Oct. 8, 2020

(65) Prior Publication Data

US 2021/0155454 A1 May 27, 2021

(30) Foreign Application Priority Data

Nov. 26, 2019 (EP) .................................. 19211415

(51) Int. Cl.
*B66B 5/00* (2006.01)
*B66B 1/28* (2006.01)
(Continued)

(52) U.S. Cl.
CPC .............. *B66B 5/0025* (2013.01); *B66B 1/28* (2013.01); *B66B 1/3461* (2013.01); *B66B 3/002* (2013.01);
(Continued)

(58) Field of Classification Search
CPC ....... B66B 5/0025; B66B 1/28; B66B 1/3461; B66B 3/002; B66B 1/468; G06N 20/00; G01P 13/00; G01P 15/00
(Continued)

(56) References Cited

U.S. PATENT DOCUMENTS 4,672,531 A * 6/1987 Uetani ................. B66B 1/2408
700/9
6,394,232 B1 * 5/2002 Iwata .................... B66B 1/2458
187/382

(Continued)

FOREIGN PATENT DOCUMENTS

CN        107601199 A     1/2018
KR  10-2017-0126821 A    11/2017

OTHER PUBLICATIONS

Lai et al. (CN 107601199 A) Method and System for Detecting Elevator Component Failure (Year: 2018).*

(Continued)

*Primary Examiner* — Jorge L Carrasquillo
(74) *Attorney, Agent, or Firm* — Birch, Stewart, Kolasch & Birch, LLP (57) ABSTRACT The invention relates to a system for detecting an out-of-operation state of an elevator system. The system comprising: a signalization sensor unit, at least one actuation sensor device, and a monitoring unit. The signalization sensor unit is configured to obtain signalization traffic data of at least one control system bus of the elevator system. The at least one actuation sensor device is configured to obtain actuation output data of at least one actuator entity of the elevator system followed by the obtained signalization traffic data. The monitoring unit configured to: generate reference actuation output data followed by the obtained signalization traffic data by applying a machine learning module, and generate a signal indicating an out-of-operation state of the elevator system to an external computing entity, in response to a detection of a deviation between the obtained output data and the generated reference output data. The invention relates also to a method for detecting an out-of-operation state of an elevator system.

18 Claims, 8 Drawing Sheets

(51) Int. Cl.
  *B66B 1/34* (2006.01)
  *B66B 3/00* (2006.01)
  *G01P 13/00* (2006.01)
  *G01P 15/00* (2006.01)
  *G06N 20/00* (2019.01)
  *B66B 1/46* (2006.01)

(52) U.S. Cl.
  CPC .............. *G01P 13/00* (2013.01); *G01P 15/00* (2013.01); *G06N 20/00* (2019.01); *B66B 1/468* (2013.01)

(58) Field of Classification Search
  USPC ......................................................... 187/247
  See application file for complete search history.

(56) References Cited

U.S. PATENT DOCUMENTS

2011/0315490 A1    12/2011  Shi et al.
2017/0349398 A1    12/2017  Toutaoui
2019/0210833 A1*    7/2019  Laakso ................. B66B 5/0018
2019/0344995 A1*   11/2019  Nowel ..................... G01H 3/06

OTHER PUBLICATIONS

Fumiya et al. (JP 2004051279 A)Elevator Control Device (Year: 2004).*
Amano (CN 1047260 A) Elevator Control Device (Year: 1990).*
Office Action issued in Chinese Application No. 202011335378.9 on Jan. 11, 2025.
Search Report issued in European Patent Application No. 19 21 1415, dated Jun. 5, 2020.

* cited by examiner

SYSTEM AND A METHOD FOR DETECTING AN OUT-OF-OPERATION STATE OF AN ELEVATOR SYSTEM BASED ON CONTROL BUS TRAFFIC

TECHNICAL FIELD

The invention concerns in general the technical field of elevator systems. Especially the invention concerns monitoring of condition of elevator systems.

BACKGROUND

Elevator systems may go out-of-operation, e.g. a movement of an elevator car may be stopped, due to many different reasons, such as due to technical failure, vandalism, etc. To minimize the impact of the out-of-operation of the elevator system on the passengers, a service request needs to be generated as soon as possible in order to send a maintenance technician to the site to fix the elevator system. The detection whether the elevator system has gone out-of-operation or not may be done based on data collected from the elevator system. However, it may be difficult to make an accurate detection whether the elevator system has gone out-of-operation or not, e.g. whether the elevator car is truly stopped or not.

Typically, the condition of the elevator system may be monitored by monitoring fault status and/or operating status of the elevator system directly from an elevator controller, e.g. by reading fault codes. At least one drawback of this may be that the access to monitor the fault/operating status may not be available, e.g. in case of old elevator systems and/or for parties other than manufacturer of the elevator system. Furthermore, it may not be possible to infer availability of the elevator from fault codes at high enough coverage and accuracy over all possible failure situations.

Another typical way to monitor the condition of the elevator system may be monitoring one or more outputs of the elevator system, e.g. movements of the elevator car, movements of one or more doors of the elevator system, open/closed status of one or more doors of the elevator system, vibrations, safety circuit state, elevator car stopping behavior, position of the elevator car inside the elevator shaft, and/or noise, etc., by means of retrofittable monitoring unit with one or more add-on sensors. However, when the data is collected by the monitoring unit retrofitted to the elevator system, the accuracy of the detection may be lower than when the data is obtained directly from the elevator controller.

Thus, the main drawback of monitoring method by means of the retrofitted monitoring unit with add-on sensor(s) is inaccuracy, because it may be challenging to infer with high accuracy whether the elevator system is out-of-operation or not, which may lead to false positive alerts (which may cause cost of maintenance visit without any problems) and/or false negative alerts, i.e. missing actual failure cases because everything seems normal but elevator is failed. Moreover, at least one drawback of monitoring the outputs of the elevator system is that it only allows detections of condition of the elevator system, when the elevator car is moving and the out-of-operation situations, when the elevator car is standing at a landing cannot be distinguished from the normal operation of the elevator system, because from the monitoring unit point of view the condition of the elevator system may look normal, but the elevator system may still be out-of-operation. Even up to three out of four out-of-operation situations may be such that the elevator car is standing at a landing.

Alternatively, the condition of the elevator system may be monitored by generating remote elevator calls to one or more elevator cars when an unconventional low-usage period is identified and by monitoring response of the elevator car to the remote elevator call. If a movement of the elevator car is not detected in response to the remote elevator call, it indicates that the elevator system may be out-of-operation. However, this causes unnecessary power consumption of the elevator system, movements of the elevator in response to the remote elevator call may irritate the passengers, and this may also cause safety issues since the elevator car may be moving unexpectedly. Moreover, the possibility to generate random remote elevator calls may pose information security issues, e.g. a malicious hacker may be able to generate a huge amount of usage on the elevator system.

Thus, there is need to develop further solutions in order to improve at least partly the reliability of monitoring of condition of an elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a system and a method for detecting an out-of-operation state of an elevator system. Another objective of the invention is that the system and the method for detecting an out-of-operation state of the elevator system improve at least partly the reliability of monitoring of condition of an elevator system.

The objectives of the invention are reached by a system and a method as defined by the respective independent claims.

According to a first aspect, a system for detecting an out-of-operation state of an elevator system is provided, wherein the system comprising: a signalization sensor unit configured to obtain signalization traffic data of at least one control system bus of the elevator system, at least one actuation sensor device configured to obtain actuation output data of at least one actuator entity of the elevator system followed by the obtained signalization traffic data, and a monitoring unit configured to: generate reference actuation output data followed by the obtained signalization traffic data by applying a machine learning module, and generate a signal indicating an out-of-operation state of the elevator system to an external computing entity, in response to a detection of a deviation between the obtained output data and the generated reference output data.

The at least one actuator entity of the elevator system may comprise elevator car, elevator door, hoisting system, door controller, and/or elevator car lighting system.

The signalization sensor unit may comprise one or more series detection devices for obtaining the signalization traffic data from a serial communication bus type control system bus.

Alternatively or in addition, the signalization sensor unit may comprise parallel detection device for obtaining the signalization traffic data from a parallel communication type control system bus.

The signalization sensor unit may be configured to: wake up from a sleep mode in response to obtaining the signalization traffic data, provide the obtained signalization traffic data to the monitoring unit, and go back to sleep mode.

The monitoring unit may further be configured to provide a remote command request to the signalization sensor unit to generate a remote command for controlling at least one actuation output of at least one actuator entity of the elevator system.

The machine learning module of the monitoring unit may be configured to receive the obtained signalization traffic data as its input data and to generate the reference actuation output data as the output data of the machine learning module by applying one or more machine learning techniques.

Historical output data of at least one actuator entity of the elevator system gathered with the at least one actuation sensor device and historical traffic data of at least one elevator control system bus gathered with the signalization sensor unit may be used as training data to train the machine learning module.

According to a second aspect, a method for detecting an out-of-operation state of an elevator system is provided, wherein the method comprising: obtaining, by a signalization sensor unit, signalization traffic data of at least one control system bus of the elevator system; obtaining, by at least one actuation sensor device, actuation output data of at least one actuator entity of the elevator system followed by the obtained signalization traffic data; generating, by a monitoring unit, reference actuation output data followed by the obtained signalization traffic data by applying a machine learning module; and generating, by the monitoring unit, a signal indicating an out-of-operation state of the elevator system to an external computing entity, in response to a detection of a deviation between the obtained actuation output data and the generated reference actuation output data.

The at least one actuator of the elevator system may comprise elevator car, elevator door, hoisting system, door controller, and/or elevator car lighting system.

The method may further comprise: waking up the signalization sensor unit from a sleep mode in response to obtaining the signalization traffic data, providing the obtained signalization traffic data to the monitoring unit, and going back to sleep mode.

Alternatively or in addition, the method may further comprise: providing, by the monitoring unit, a remote command request to signalization sensor unit to generate a remote command for controlling at least one actuation output of at least one actuation entity of the elevator system.

The generating the reference actuation output data may comprise receiving the obtained signalization traffic data as input data of the machine learning module and generating the reference actuation output data as the output data of the machine learning module by applying one or more machine learning techniques.

Alternatively or in addition, the method may comprise: gathering historical actuation output data of at least one actuator entity of the elevator system with the at least one actuation sensor device, gathering historical signalization traffic data of at least one elevator control system bus with signalization sensor unit, and using the gathered historical output data and historical traffic data as training data to train the machine learning module.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
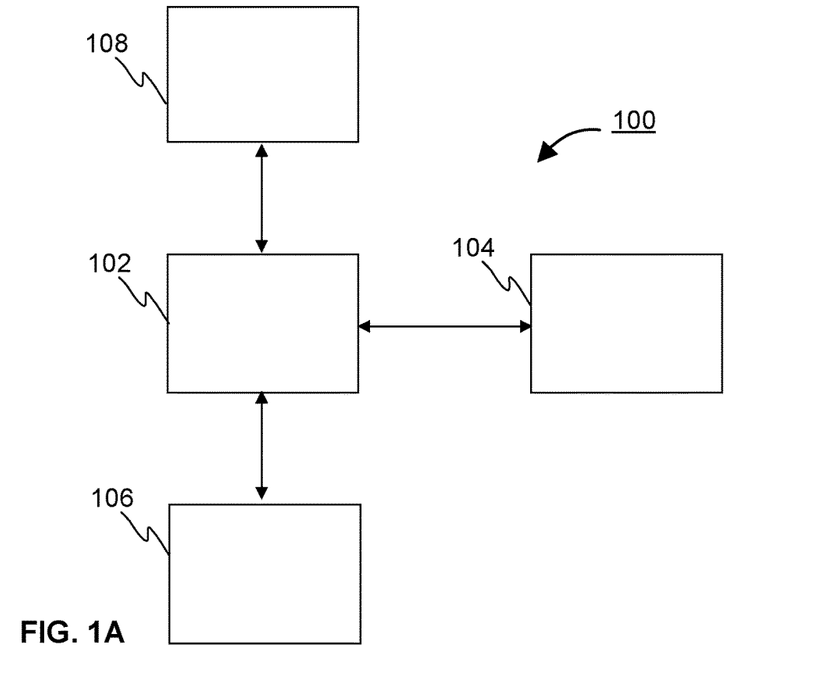
FIGS. 1A and 1B illustrate schematically simple examples of a system according to the invention.

FIG. 1A illustrates schematically a simple example of a system 100 according to the invention for detecting an out-of-operation state of an elevator system. With the term "out-of-operation state of the elevator system", i.e. out-of-service state of the elevator system, is meant throughout this application any condition of the elevator system, wherein the elevator system is not able to serve its purpose, e.g. an elevator car is not able to serve elevator call(s) generated for said elevator car, an elevator door is not opening/closing, etc. The out-of-operation state may be caused e.g. by technical failure, vandalism, etc. The system 100 comprises a monitoring unit 102, at least one actuation sensor device 104 for obtaining output actuation data of at least one actuator entity of the elevator system 200, and a signalization sensor unit 106 for obtaining signalization traffic data of at least one control system bus of the elevator system 200.

Figure 1B:
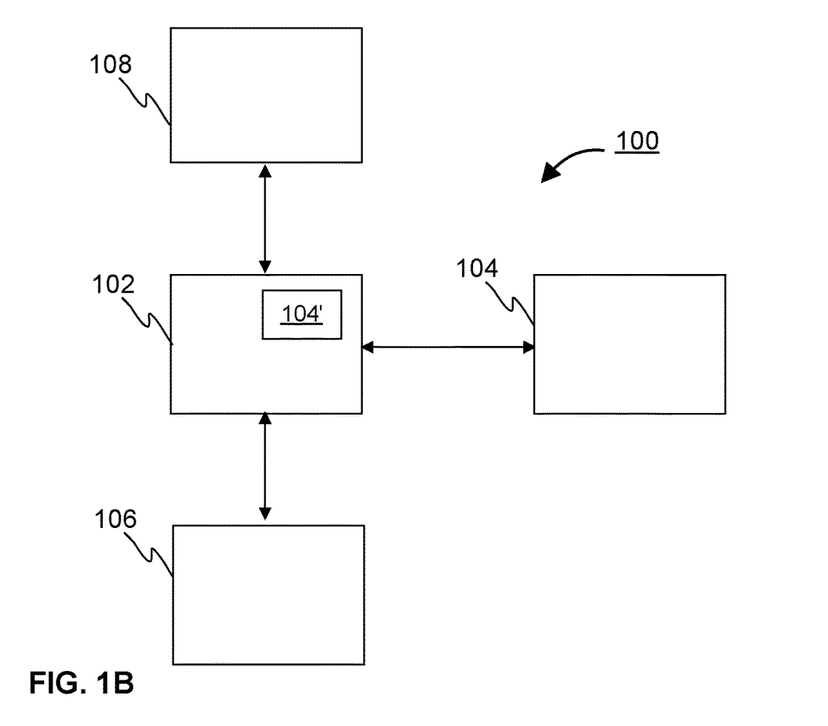

The at least one actuator entity of the elevator system 200 may comprise elevator car 202, elevator door, e.g. landing door 216a-216n or elevator car door 212, hoisting system 204, door control unit, and/or elevator car lighting system. The at least one actuation sensor device 104 may be internal sensor device(s) of the monitoring unit 102. Alternatively, the at least one actuation sensor device 104 may be external sensor device(s) communicatively coupled to the monitoring unit 102 wirelessly or wired technologies. If the system 100 comprises more than one actuation sensor device 104, some of the actuation sensor devices 104' may be internal sensor devices and some of the actuation sensor devices 104 may be external sensor devices. FIG. 1B illustrates another simple example of the system 100 according to the invention, wherein the system comprises internal actuator sensor device(s) 104' and external actuator sensor device(s) 104. According to one example, the actuation sensor device for obtaining output actuation data of an elevator door, such as landing door 216a-216n or elevator car door 212, may preferably be external sensor device. According to another example, the actuation sensor device for obtaining output actuation data of the elevator car 202 may be internal sensor device of the monitoring unit 102 which may be arranged to the elevator car 200.

The system 100 may further comprise an external computing entity 108. The external computing entity 108 may be one of the following: a cloud server, a service center, a data center. The external entity herein means an entity that locates separate from the elevator system. The implementation of the external computing entity 108 may be done as a stand-alone entity or as a distributed computing environment between a plurality of stand-alone devices, such as a plurality of servers providing distributed computing resource. The monitoring unit 102 and the external computing entity 108 are communicatively coupled to each other. The communication between the monitoring unit 102 and the external computing unit 108 may be based on one or more known communication technologies, either wired or wireless.

Figure 2:
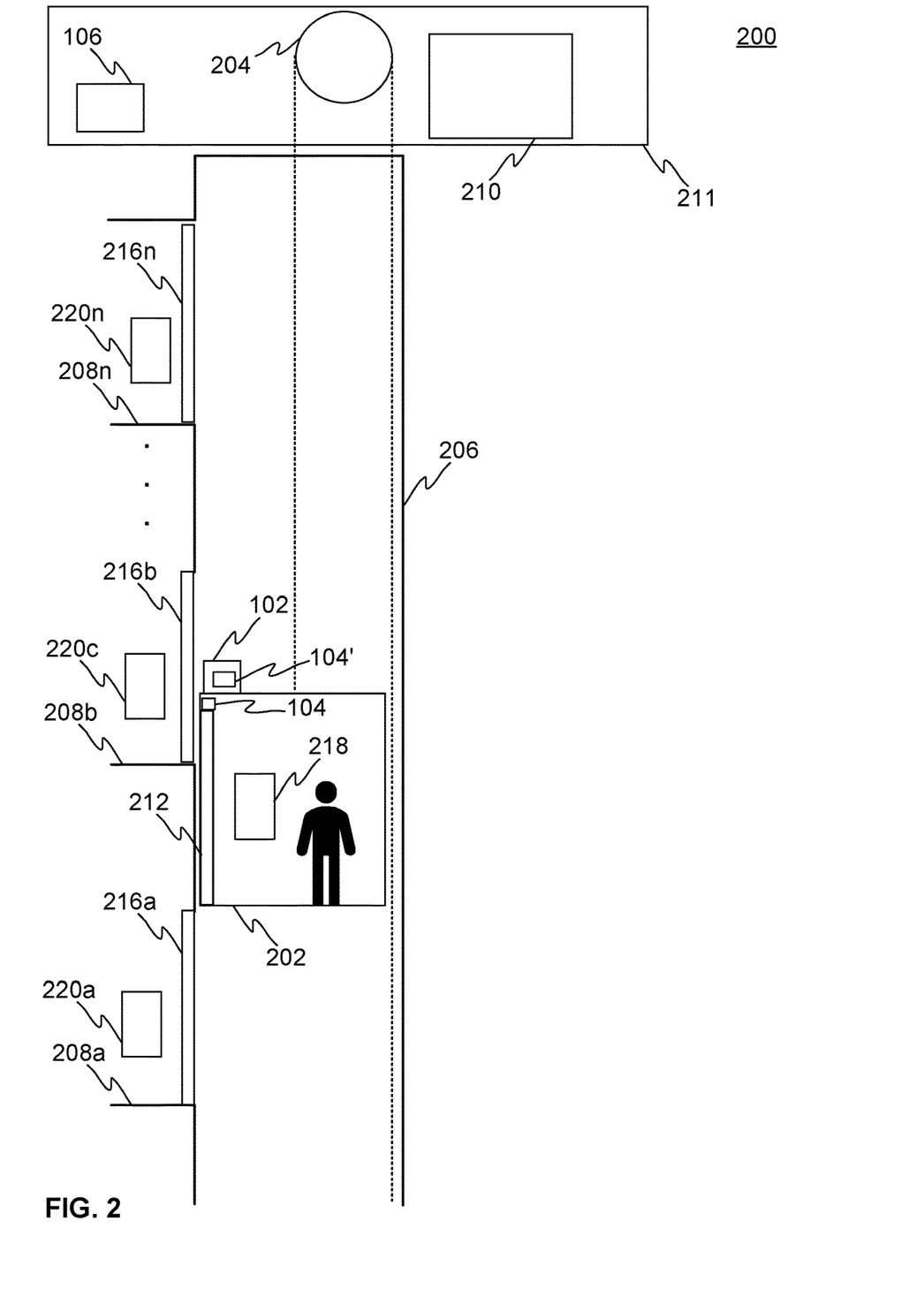
FIG. 2 illustrates schematically an example elevator environment, wherein the embodiments of the invention may be implemented.

FIG. 2 illustrates schematically an example elevator environment, wherein the embodiments of the invention may be implemented as will be described. The example elevator environment illustrated in FIG. 2 is an elevator system 200, which may comprise an elevator control system 210, an elevator car 202, and a hoisting system 204 configured to drive the elevator car 202 along an elevator shaft 206 between landings 208a-208n. The elevator control system 210 may be configured to control the operation of the elevator system 200. In FIG. 2 the elevator control system 210 locates in a machine room 211, but the elevator control system 210 may also locate in one of the landings 208a-208n. The elevator car 202 may comprise an elevator car door 212 and a door control unit, e.g. a door operator (for sake of clarity not shown in FIG. 2). Furthermore, each landing 208a-208n may comprise a landing door 216a-216n. The elevator system 200 may further comprise a car operating panel 218 arranged inside the elevator car 202 and a landing call panel 220a-220n arranged to each landing 208a-208n. The car operating panel 218 may comprise one or more elevator buttons 302 for controlling at least one operation of the elevator system 200, e.g. to move the elevator car 202 to a desired landing, open or close the elevator doors (landing door 216a-216n and/or elevator car door 212), generating an elevator alarm, making an emergency call, etc. The landing call panel 220a-220n may comprise one or more elevator buttons 302 for controlling the operation of the elevator system, e.g. to call the elevator car 202 to a desired landing, i.e. said landing 208a-208n wherein said landing call panel 220a-220n resides. In the example elevator environment 200 of FIG. 2 the signalization sensor unit 106 is arranged inside the machine room 211. However, the physical location of the signalization sensor unit 106 in the elevator system 200 is not limited and the signalization sensor unit 106 may reside also in any other location within elevator system 200. In the example elevator environment 200 of FIG. 2 the monitoring unit 102 is arranged to the elevator car 202 travelling inside the elevator shaft 204 between the landings 206. However, the physical location of the monitoring unit 102 in the elevator system 200 is not limited and the monitoring unit 102 may reside also in any other location within elevator system 200. In the example elevator environment 200 of FIG. 2 the at least one actuation sensor device 104 comprises at least one external actuation sensor device 104 and at least one internal actuation sensor device 104'.

Preferably, the signalization sensor unit 106 may be configured to obtain the signalization traffic data of a landing signalization bus and/or a car signalization bus. The landing signalization bus is arranged between the landing call devices 220a-220n and the elevator control system 210. The car signalization bus is arranged between the car operating panel 218 and the elevator control system 210. The signalization traffic data of the landing signalization bus represents one or more signalization commands, e.g. landing call or destination call, generated in response to a user interaction via the landing call device 220a-220n, e.g. by pushing or touching one or more elevator buttons 302 of the landing call device 220a-220n. The landing call may comprise information of the direction, i.e. upwards or downwards, to which elevator car is desired to travel. Destination call may comprise information of the desired landing to which the elevator car is desired to travel. The signalization traffic data of the car signalization bus represents one or more signalization commands, e.g. a car call, generated in response to a user interaction via the car operating panel 218, e.g. by pushing or touching one or more user interface buttons of the car operating panel 218. The car call may comprise an information of the landing to which the elevator car is desired to travel.

Alternatively or in addition, the signalization sensor unit 106 may be configured to obtain the signalization traffic data of a control system bus in car cable, control bus between elevator control system 210 and hoisting motion control system (e.g. a drive unit), control bus between elevator control system 210 and door control unit, control bus between elevator control system 210 and elevator group control system, and/or debug port of processing unit of the elevator control system 210, wherein the signalization traffic data comprises one or more signalization commands generated by the control system/control unit in question. For example, the signalization traffic data may comprise a signalization command from the elevator control unit 210 to the hoisting motion control system to drive the elevator car 202 from one landing to one or more other landings. According to another example, the signalization traffic data may comprise a signalization command from the elevator control unit 210 to the door control unit to open the elevator doors.

The one or more signalization commands of the signalization traffic data may be individual signalization commands. Alternatively, if the signalization traffic data comprises more than one signalization commands, the more than one signalization commands may form a sequence or a pattern of signalization commands.

The signalization sensor unit 106 is configured to obtain signalization traffic data of the at least one control system bus of the elevator system 200 and the at least one actuation sensor device 104, 104' is configured to obtain output actuation data of the at least one actuator entity of the elevator system 200 followed by the obtained signalization traffic data. The signalization sensor unit 106 is configured to provide the obtained signalization traffic data to the monitoring unit 102 and the at least one actuation sensor device 104, 104' is configured to provide the obtained output actuation data to the monitoring unit 102.

The actuation output data of the elevator car 202 being the actuator entity may be movement of the elevator car 202 or non-movement of the elevator car 202. The direction of the movement of the elevator car 202 may be upwards or downwards. The actuation output data of the elevator door, e.g. landing door 216a-216n or elevator car door 212, being the actuator entity may be movement of the elevator door or non-movement of the elevator door. The movement of the elevator door may be opening or closing. The actuation output data of the hoisting system 204 being the actuator entity may be hoisting movement or non-hoisting movement. The actuation output data of the door control unit being the actuator entity may be movement of the elevator door or non-movement of the elevator door. The actuation output data of the elevator car lighting system being the actuator entity may be lighting on or lighting off.

If the signalization traffic data comprises more than one signalization commands forming a sequence or a pattern of signalization commands, the actuation output data followed by said signalization traffic data forming the sequence or the pattern of signalization commands may comprise one or more individual output functions or more than one output functions forming a sequence or a pattern of output functions.

The at least one actuation sensor device 104, 104' may comprise, e.g. accelerometer, magnetometer, gyroscope, inclinometer, pressure sensor, temperature sensor, microphone, current sensor, etc., for detecting at least one actuation output of the elevator system 200 and/or for providing actuation output data of the elevator system 200. For example, one or more accelerometers may be used to obtain data, e.g. acceleration, position, speed, etc., indicating movement of the elevator car 202 and/or elevator door, e.g. landing door 216a-216n or car door 212.

Figure 6:
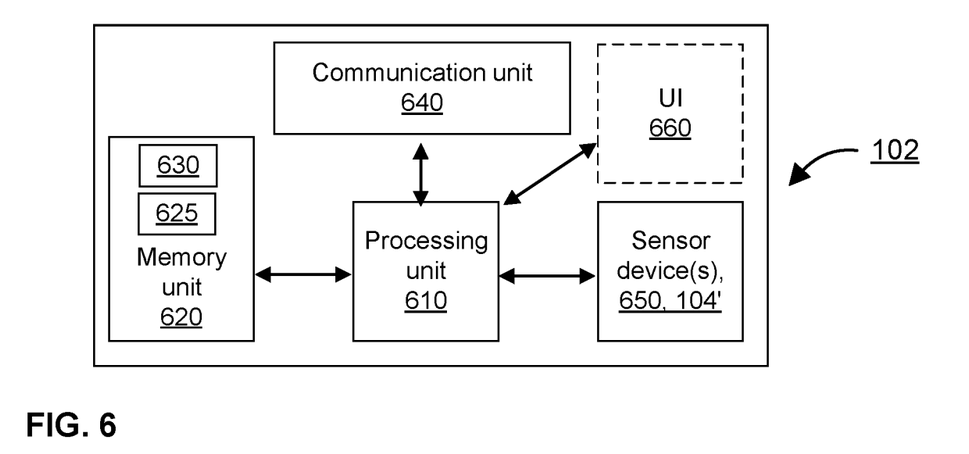
FIG. 6 illustrates schematically an example of components of a monitoring unit according to the invention.

The monitoring unit 102 is configured to receive the obtained actuation output data from the at least one actuation sensor device 104, 104' and signalization traffic data from the signalization sensor unit 106. Moreover, the monitoring unit 102 is configured to generate reference output data followed by the obtained traffic data by applying a machine learning module, i.e. a machine learning model, 630. The machine learning module 630 receives the obtained signalization traffic data as its input data and the reference actuation output data is generated as the output data of the machine learning module 630 by applying one or more machine learning techniques. For example, the following known one or more machine learning techniques may be applied: decision trees, support vector machines, neural networks, or any suitable data-driven method. The monitoring unit 102 is able to infer by using the machine learning module 630 from the input data, i.e. obtained signalization traffic data, the typical reference output data of the machine learning model, i.e. what is the expected actuation output data with the obtained input signalization traffic data. In other words, the machine learning module 603 processes the input data, i.e. obtained signalization traffic data, and provides output data, i.e. the reference actuation output data. When the elevator system 200 is operating as expected, each of the one or more signalization commands of the signalization traffic data is typically followed by actuation output data comprising specific one or more actuation output functions. For example, if the obtained input data, i.e. the signalization traffic data, indicates generation of elevator call to one of the landings 208a-208n, e.g. the passenger has pushed an elevator button 302a-302n of a landing call device 220a-220n at one of the landings 208a-208n, the monitoring unit 102 may infer from the reference actuation output data of the machine learning module 630 that the elevator car 202 is expected to move to the said landing 208a-208n to which the elevator call is generated. According to another example, if the obtained input data, i.e. the signalization traffic data, indicates opening of an elevator door, e.g. the elevator control system 210 generates a door opening command to the door control unit, the monitoring unit 102 may infer from the reference actuation output data of the machine learning module 630 that the elevator door is expected to open.

The machine learning module 630 may be trained by using historical actuation output data of the at least one actuator entity of the elevator system 200 and historical signalization traffic data of at least one elevator control system bus as training data. The historical actuation output data of the at least one actuator entity of the elevator system 200 may be gathered with the at least one actuation sensor device 104, 104' in the long term during the operation of the elevator system 200. The historical signalization traffic data of the at least one elevator control system bus may be gathered with the signalization sensor unit 106 in the long term during the operation of the elevator system 200. When the machine learning module 630 is trained properly, the accurate of the generated reference actuation output data may be increased. In order to improve the training of the machine learning module 630, versatile training data may be preferably used. For example, training data comprising historical actuation output data of the at least one actuator entity of the elevator system 200 and historical signalization traffic data of at least one elevator control system bus from a plurality of different operation situations of the elevator system 200. The accuracy of the generated reference actuation output data may also depend on the initial training data used for training of the machine learning module 630.

If the elevator system 200 is not operating as expected, i.e. the elevator system 200 is in the out-of-operation state for some reason, the obtained actuation data deviates, i.e. differs, from the generated reference actuation output data. In other words, if the obtained actual actuation output data followed by the obtained signalization traffic data deviates from the generated reference actuation output data followed by the same obtained signalization traffic data, it indicates that the elevator system 200 is in the out-of-operation state. The monitoring unit 102 is configured to generate at least one signal indicating an out-of-operation state of the elevator system 200 to the external computing entity 108, in response to a detection of a deviation between the obtained actuation output data and the generated reference actuation output data.

For example, if the obtained signalization traffic data indicates e.g. a generation of elevator call to one of the landings 208a-208n, the monitoring unit 102 infers from the reference actuation output data of the machine learning module 630 that the elevator car 202 is expected to move to the said landing 208a-208n to which the elevator call is generated and if according to the obtained actuation output data from the at least one actuator sensor device 104, 104' the elevator car 202 is not moving, the monitoring unit 102 detects the deviation between the between the obtained actuation output data and the reference actuation output data and generates the signal indicating the out-of-operation state of the elevator system 200 to the external computing entity 108.

In response to receiving the at least one signal indicating the out-of-operation state of the elevator system 200, the external computing entity 108 may be configured to generate an indication that the elevator system 200 is out of operation to instruct a maintenance personnel to fix, i.e. repair, the elevator system 200, for example. This enables that the repair of the elevator system 200 may be expedited in order to improve the availability of the elevator system 200, i.e. the time that elevator system 200 is in operation. According to an example, the out-of-operation indication may be provided directly from the external computing entity 108 to a mobile terminal, e.g. mobile phone or tablet computer, of the maintenance personnel.

The power for the signalization sensor unit 106 may be provided from the mains via a plug or similar, but preferably the signalization sensor unit 106 may be powered by one or more batteries or capacitors in order to avoid cumbersome powering from mains and/or enabling retrofitting the signalization sensor unit 106 into an existing elevator system. However, this may limit the power available for the components of the signalization sensor unit 106. Thus, in order to reduce the power consumption of the signalization sensor unit 106, the signalization sensor unit 106 may be configured to be mainly in a sleep mode. In the sleep mode the signalization sensor unit 106 may be arranged in a low power consumption mode or may be turned off. In the low power consumption mode, the signalization sensor unit 106 may consume approximately a few microamperes or even less. The signalization sensor unit 106 may be configured to wake up from the sleep mode in response a detection of signalization traffic data and to provide the obtained signalization traffic data to the monitoring unit 102. This means that the signalization sensor unit 106 is mainly in the sleep mode and waits for an interrupt signal indicating the detection of the signalization traffic data. After providing the obtained signalization traffic data to the monitoring unit 102, the signalization sensor unit 106 may be configured to go back to the sleep mode.

The at least one control system bus of the elevator system 200 that may be monitored with the signalization sensor unit 106 may be a serial communication bus type and/or a parallel communication type. In order to be able to monitor traffic data of one or more serial communication bus type control system bus, the signalization sensor unit 106 comprises one or more serial detection devices 312a-312n for obtaining signalization traffic data from the serial communication type control system bus. In order to be able to monitor traffic data of one or more parallel communication bus type control system bus, the signalization sensor unit 106 comprises parallel detection device 304 for obtaining signalization traffic data from the parallel communication type control system bus. In order to be able to monitor traffic data of both types of the control system busses with one signalization sensor unit 106, the signalization sensor unit 106 comprise one or more serial detection devices 312a-312n for obtaining signalization traffic data from a serial communication type control system bus and parallel detection device 304 for obtaining signalization traffic data from the parallel communication type control system bus.

Figure 3A:
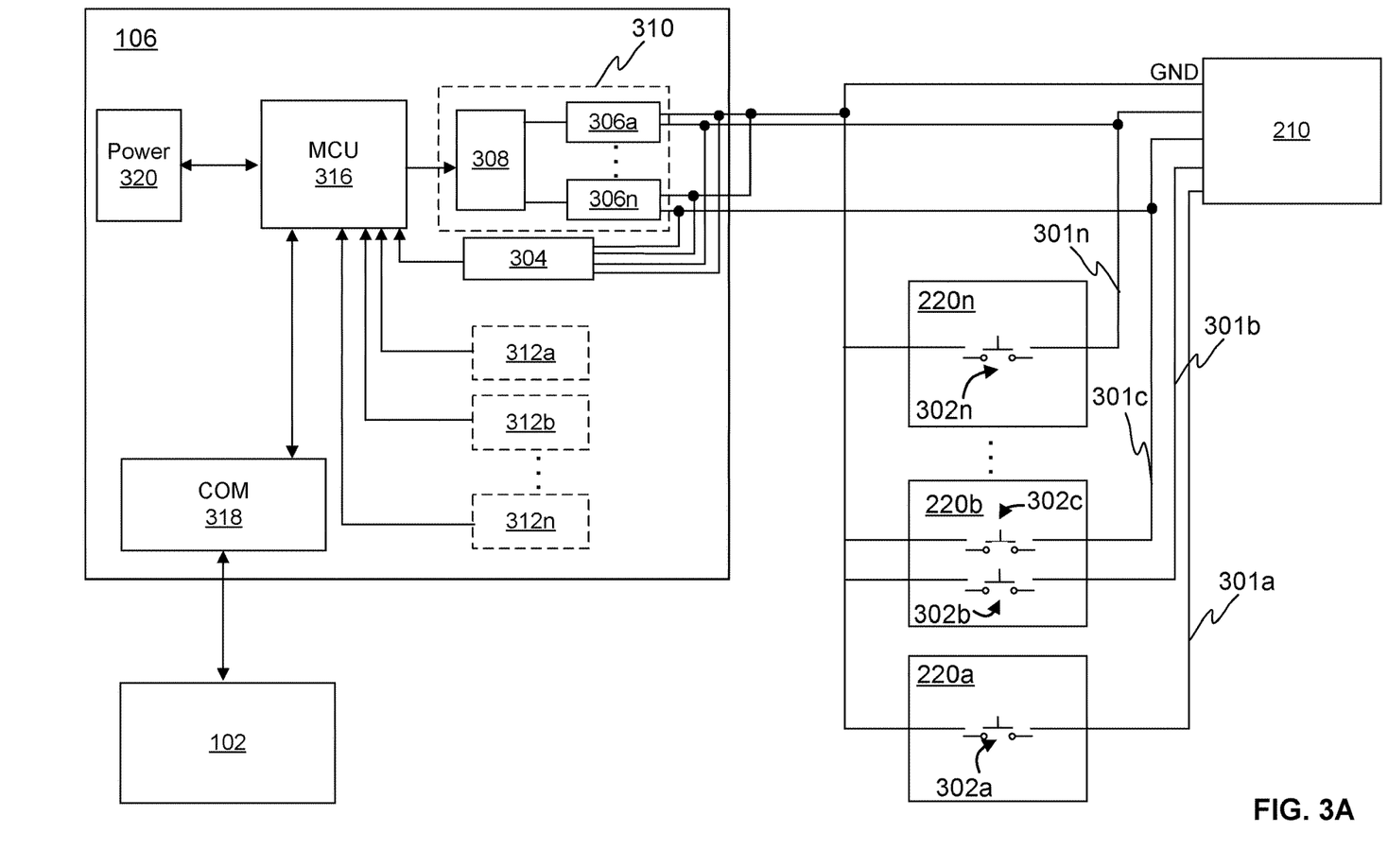
FIGS. 3A-3C illustrate schematically examples of connections between a signalization sensor unit and at least one control system bus of the elevator system.
Figure 3B:
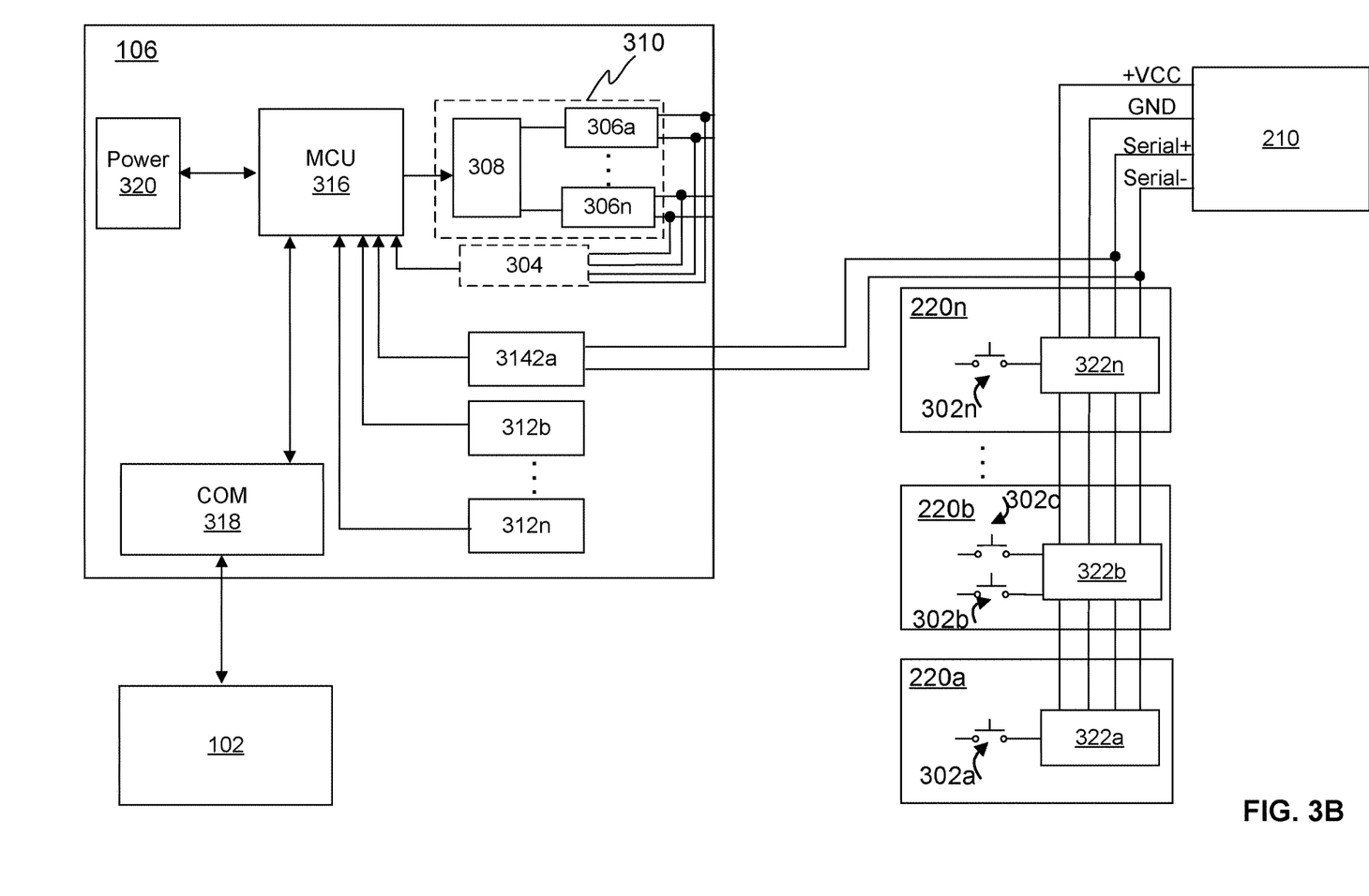
Figure 3C:
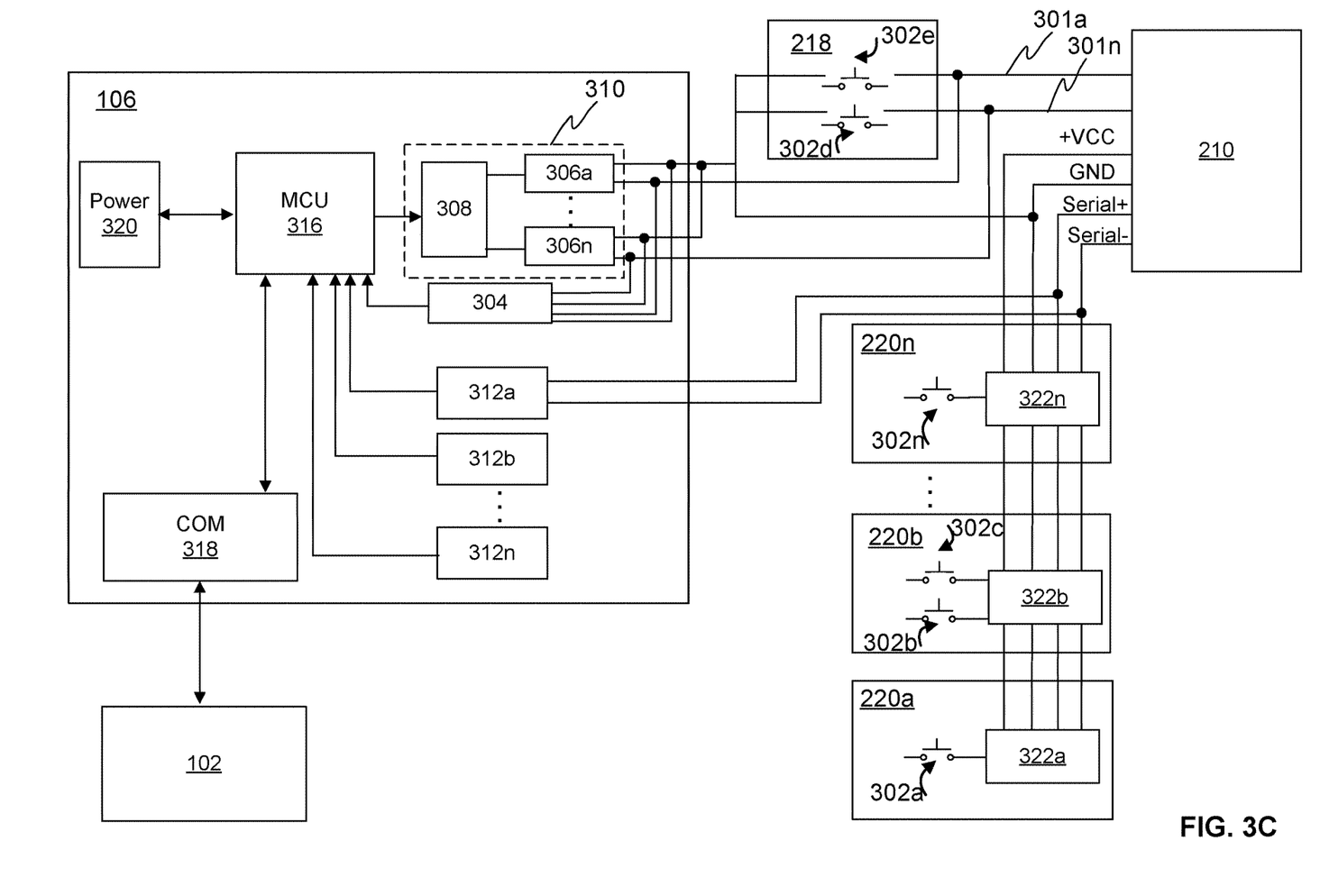

FIGS. 3A-3C illustrate schematically examples of different connections between the signalization sensor unit 106 and the at least one control system bus of the elevator system 200 for obtaining signalization traffic data from a serial communication type control system bus and/or from a parallel communication type control system bus. FIGS. 3A-3C also illustrates schematically an example of components of the signalization sensor unit 106 according to the invention. In the examples of FIGS. 3A-3C the at least one control system bus is a landing signalization bus and/or car signalization bus. However, the example connections illustrated in the examples of FIGS. 3A-3C may be implemented also between the signalization sensor unit 106 and any other at least one control system bus of the elevator system 200. The examples of FIGS. 3A-3C illustrate the connections between the entities, but not the physical locations of the entities in the elevator system 200.

FIG. 3A illustrates schematically an example of the signalization sensor unit 106 according to the invention connected to the parallel communication type control system bus. In the example of FIG. 3A the control system bus is a landing signalization bus comprising an individual signalization wire 301a-301n from the elevator control system 210 to each elevator button 302a-302n of each landing call device 220a-220n. In the example of FIG. 3A the landing call device 220a of the bottom landing 208a comprises one elevator button 302a, the landing call device 220n of the topmost landing 208n comprises one elevator button 302n and the landing call device 220b of the second landing 208b comprises two elevator buttons 302b, 302c. The elevator buttons 302a-302n may be implemented for example as switches as illustrated in FIG. 3A-3C. The parallel detection device 304 of the signalization sensor unit 106 may be connected, i.e. coupled, to the one or more signalization wires 301a-301n to obtain signalization traffic data transferred via said one of the one or more signalization wires 301a-301n. For example, in the example of FIG. 3A, parallel detection device 304 is connected to the n:th signalization wire 301n transferring traffic data between the elevator control unit 210 and the elevator button 302n of the landing call device 220n of the topmost landing 208n and to the third signalization wire 301c transferring traffic data between the elevator control unit 210 and the elevator button 302c of the landing call device 220b of the second landing 208n. Alternatively or in addition, the parallel detection device 304 may be connected to one or more other signalization wires 301a-301n transferring traffic data between the elevator control unit 210 and the elevator buttons 302a-302n of the landing call devices 220a-220n than presented in the example of FIG. 3A. The parallel detection device 304 of the signalization sensor unit 106 may be connected to the one or more signalization wires 301a-301n e.g. by means of wire splices or any other similar way.

The parallel detection device 304 may comprise a voltage isolator configured to obtain the signalization traffic data by detecting changes in voltage at the terminals of the switches of elevator buttons 302a-302n. In other words, the signalization traffic data may be detected as changes in the voltage at the terminals of the switches of elevator buttons 302a-302n. For example, in the example of FIG. 3A, when an elevator call has been generated e.g. via the elevator button 302n of the landing call device 220n of the topmost landing 208n, the voltage isolator connected to the n:th signalization wire 301n of the elevator button 302n of the landing call device 220n of the topmost landing 208n detects a change in the voltage at the terminals of the switch of elevator buttons 302n. In response to the detection of the signalization traffic data, the voltage isolator generates the interrupt signal indicating the detection of the signalization traffic data to the microcontroller 316 of the signalization sensor unit 106. In response to the interrupt signal the microcontroller wakes up and provides the obtained signalization traffic data to the monitoring unit 102. After providing the obtained signalization traffic data to the monitoring unit 102, the microcontroller instructs the signalization sensor unit 106 to go back to the sleep mode.

The signalization sensor unit 106 may further comprise the one or more serial detection devices 312a-312n for obtaining signalization traffic data from a serial communication type control system bus. In the example of FIG. 3A the one or more serial detection devices 312a-312n are not used and thus not connected to any control system bus. The one or more serial detection devices 312a-312n may be one or more data logger devices for obtaining signalization from serial communication control system bus based on different communication protocols. For example, the signalization sensor unit 106 may comprise one data logger device 312a for Local Operating Network (LON) protocol-based control system bus, one data logger device 312b for Controller Area Network (CAN) protocol-based control system bus, and/or one or more data logger devices 312n for any other protocol-based control system bus.

The signalization sensor unit 106 comprises further a processing unit 316 comprising one or more processors, for processing information and control the operation of the signalization sensor unit 106, among other tasks. Preferably, the processing unit 316 may be implemented as a micro-controller (MCU) with embedded software.

The signalization sensor unit 106 comprises further a communication unit 318 for providing an interface for communication with any external unit, such as the monitoring unit 102 and/or any external systems. The communication unit 318 may comprise one or more communication devices, e.g. radio transceiver, antenna, etc. The communication unit 318 may be based on one or more known communication technologies in order to exchange pieces of information as described earlier. The communication unit 318 may preferably be based on one or more medium-range wireless radio frequency technologies, e.g. sub-gigahertz frequency technologies, in order to enable long distance communication through concrete walls and/or floors with the monitoring unit 102. The sub-gigahertz frequency technology may be LoRa (Long Range) or any other sub-gigahertz frequency technologies.

The signalization sensor unit 106 may comprise further a power supply unit 320. The power supply unit 320 may comprise a power supply source, e.g. one or more batteries or capacitors, for providing power to the components of the signalization sensor unit 106. Moreover, the power supply unit 320 may further comprise a power harvester, e.g. one or more solar cells, for providing power to the components of the signalization sensor unit 106.

The signalization sensor unit 106 may optionally comprise further a remote command unit 310 for generating elevator command to the elevator system 200 in response to receiving remote command request from the monitoring unit 102 as will be described later in this application. The remote command unit 310 may comprise one or more switch devices 306a-306n, e.g. a relay, solid-state switch, micro-switch, membrane switch, etc. Each of the one or more switch devices 306a-306n of the remote command unit 310 is connectable to one of the one or more signalization wires 301a-301n. For example, in the example of FIG. 3A, the first switch device 306a is connected to the n:th signalization wire 301n transferring traffic data between the elevator control unit 210 and the elevator button 302 of the landing call device 220n of the topmost landing 208n and the n:th switch device 306n is connected to the third signalization wire 301c transferring traffic data between the elevator control unit 210 and the elevator button 302c of the landing call device 220b of the second landing 208n. The remote command unit 310 of the signalization sensor unit 106 may also comprise only one switch device 306a-306n or one or more further switch devices 306a-306n to be connected to one or more other signalization wires 301a-301n than presented in the example of FIG. 3A. The one or more switch devices 306a-306n of remote command unit 310 of the signalization sensor unit 106 may be connected to the respective one or more signalization wires 301a-301n e.g. by means of wire splices or any other similar way. The remote command unit 310 may further comprise a switch control unit 308, e.g. relay coil driving circuit, configured to control the operation of the one or more switch devices 306a-306n.

FIG. 3B illustrates schematically an example of the signalization sensor unit 106 according to the invention connected to the serial communication type control system bus. The example signalization sensor unit 106 of FIG. 3B is otherwise similar to the example signalization sensor unit of FIG. 3A except instead of connecting the parallel detection device 304 to the one or more signalization wires 301a-301n the one or more serial detection devices 312a-312n are connected to the serial communication type control system bus, which is a landing signalization bus in the example of FIG. 3B. In the example of FIG. 3B the parallel detection device 304 and the remote command unit 310 are not used and thus not connected to any control system bus. The serial communication type control system bus comprises a serial control unit 322a-322n for each landing call device 220a-220n connected in series with each other. Each serial control unit 322a-322n comprises a processing unit, e.g. a micro-controller and a serial transceiver.

The one or more serial detection devices 312a-312n, i.e. the one or more datalogger devices, are configured to obtain the signalization traffic data of the at least one serial communication type control system bus. The one or more datalogger devices 312a-312n may be connected to the at least one serial communication type control system bus to monitor, i.e. listen, the signalization traffic data so that the one or more datalogger devices 312a-312n do not disturb the at least one serial communication type control system bus. The one or more datalogger devices 312a-312n may be continuously obtaining the signalization traffic data. Alternatively, in response to the detection of the signalization traffic data, the one or more data logger devices 312a-312n generate the interrupt signal indicating the detection of the signalization traffic data to the microcontroller 316 of the signalization sensor unit 106. In response to the interrupt signal the microcontroller 316 wakes up and provides the obtained signalization traffic data to the monitoring unit 102. The signalization sensor unit 106 may provide all the obtained signalization traffic data to the monitoring unit 102 or the microcontroller 316 may process the obtained signalization traffic data so that only a part of the signalization traffic data is provided to the monitoring unit 102. The processing may comprise, e.g. selection, conversion, etc. Providing all the obtained signalization traffic data to the monitoring unit 102 increases the volume of radio transmissions, i.e. the communication, from the signalization sensor unit 106 to the monitoring unit 102, which in turn increases the power consumptions. Thus, providing only a part of the obtained signalization traffic data reduces the radio transmissions, i.e. the communication, from the signalization sensor unit 106 to the monitoring unit 102, which in turn reduces power consumption of the signalization sensor unit 106.

For example, in the example of FIG. 3B, when an elevator call has been generated e.g. via the elevator button 302n of the landing call device 220n of the topmost landing 208n, the data logger device 312a obtains the signalization traffic data. The signalization sensor unit 106 may provide the obtained signalization traffic data to the monitoring unit 102. Alternatively, in response to the obtaining the signalization traffic data, the data logger device 312a generates the interrupt signal indicating the detection of the signalization traffic data to the microcontroller 316 of the signalization sensor unit 106 and in response to the interrupt signal the microcontroller 316 wakes up and provides the obtained signalization traffic data to the monitoring unit 102. After providing the obtained signalization traffic data to the monitoring unit 102, the microcontroller instructs the signalization sensor unit 106 may go back to the sleep mode.

FIG. 3C illustrates schematically an example of the signalization sensor unit 106 connected to one serial communication type control system bus and to one parallel communication type control system bus. In the example of FIG. 3C one or more serial detection devices 312a-312n, e.g. the first serial detection device 312a, in this example, are connected to the serial communication type control system bus, which is a landing signalization bus, in order to obtain signalization traffic data of the landing signalization bus, i.e. the signalization traffic data transferred between the elevator control system 210 and one or more elevator buttons 302a-302n of the one or more landing call devices 220a-220n. Furthermore, in the example of FIG. 3C the parallel detection device 304 of the signalization sensor unit 106 is connected to one or more signalization wires 301a-301n in order to obtain signalization traffic data of a car signalization bus, i.e. the signalization traffic data transferred between the elevator control system and one or more elevator buttons 302d, 302e of the car operating panel 218. In the example of FIG. 3C the signalization traffic data may be obtained as discussed above referring to FIGS. 3A and 3B, but the signalization sensor unit 106 of FIG. 3C enables monitoring and obtaining traffic data of serial communication type control system bus and parallel communication type control system bus with a single signalization sensor unit 106.

According to an example embodiment of the invention, the system 100 enables also monitoring the condition of the elevator system 200 by generating remote elevator command to the elevator system 200. In order to monitor the condition of the elevator system 200 by generating the remote elevator command request the monitoring unit 102 may be configured to provide the remote command request to the signalization sensor unit 106 for generating a remote command for controlling at least one actuation output of at least one actuator entity of the elevator system 200. The monitoring unit 102 may e.g. generate for the signalization sensor unit 106 one or more control signals comprising an instruction to generate a command for controlling at least one actuation output of at least one actuator entity of the elevator system 200.

The monitoring unit 102 may be configured to provide the remote command request to the signalization sensor unit 106 in response to receiving an instruction from the external computing entity 108. The external computing entity 108 may be configured to instruct the monitoring unit 102 to provide the remote command request to the signalization sensor unit 106 in response to receiving the at least one signal indicating the out-of-operation state of the elevator system 200 from the monitoring unit 102. Alternatively or in addition, the monitoring unit 102 may be configured to provide the remote command request to the signalization sensor unit 106 according to a predefined time-scheme, i.e. time schedule. The predefined time-scheme may comprise regular intervals, e.g. once a year, once a month, once a week, etc., or irregular time intervals. This enables scheduled remote monitoring of the elevator system. Preferably, the monitoring unit 102 may be configured to provide the remote command request to the signalization sensor unit 106 when an unconventional low-usage period of the elevator system 200 is identified.

The generated remote command may be a remote elevator command, e.g. a landing call, destination call, or a car call. If the generated remote elevator command is a landing call, destination call, or a car call, the actuation output of the at least one actuator entity of the elevator system 200 may be movement of the elevator car 202. In other words, the signalization sensor unit 106 generates a landing call, destination call, or a car call in response to receiving one or more control signals from the monitoring unit 102 in order to move the elevator car 202 according to the generated landing call, destination all, or car call. Alternatively or in addition, the generated remote command may be a remote elevator command, e.g. one of the following: an emergency call, elevator alarm, opening or closing command of an elevator door (e.g. a landing door 216a-216n and/or elevator car door 212); and the corresponding actuation output of the actuator entity of the elevator system 200 is at least the one of the following: making of an emergency call, generating an elevator alarm, opening or closing an elevator door, respectively.

The signalization sensor unit 106 may be electrically connected via the one or more signalization wires 301a-301n to bridge the switch of one or more elevator buttons 302a-302n. The verb "bridging" means to creating an electric connection between the terminals of the switches of the elevator buttons 302a-302n in order to imitate activation, e.g. pushing, of said elevator button 302a-302n. The one or more switch devices 306a-306n of the remote command unit 310 of the signalization sensor unit 106 may be configured to provide the bridging the switches of the one or more elevator buttons 302a-302n. In other words, the one or more switching devices 306a-306n of the remote command unit 310 of the signalization sensor unit 106 may create an electric connection between the terminals of the switches of the one or more elevator buttons 302a-302n causing that the switch of the one or more elevator buttons 302a-302n is short-circuited to generate the command corresponding to an command generated in response to an activation of said elevator button 302a-302n. The control signal received from the monitoring device 102 may be a simple on/off signal to change the state of the one or more switching devices 306a-306n from open state to closed state and the other way around. For example, in response to receiving the signal from the monitoring device 102, the one or more switching devices 306a-306n may change their state to the closed state, in which the one or more switching devices 306a-306n may create the electrical connection between the terminals of the switches of the one or more elevator buttons 302a-302n. Alternatively, in response to receiving an off signal from the monitoring device 102, the one or more switching devices 306a-306n may change their state to the open state, in which the one or more switching devices 306a-306n do not create electrical connection between the terminals of the switches of the one or more elevator buttons 302a-302n.

The signalization sensor unit 106 may be configured to wake up from the sleep mode at regular or irregular intervals to check if there exist any waiting remote command requests from the monitoring unit 102. If at least one waiting remote command request is detected, the signalization sensor unit 106 may be configured to generate the remote command for controlling at least one actuation output of at least one actuation entity of the elevator system 200 according to the detected at least one remote command. Furthermore, the signalization sensor unit 106 may be configured to go to back to the sleep mode after generating the remote command.

The monitoring unit 102 may further be configured to monitor the actuation output of the at least one actuation device of the elevator system 102 to define whether the elevator system 200 is responding to the remote command in expected manner, e.g. by comparing the monitored response to a reference response. The responding in expected manner and/or the reference response may depend on the generated remote command. For example, if the generated remote command is a remote elevator command, e.g. a landing call or an elevator car call, the reference response to which the monitoring unit 102 may compare the monitored response is movement of the elevator car 202 and the elevator system 200 may be defined to respond to the generated remote elevator command request in the expected manner, when the monitoring unit 102 detects by means of the at least one actuation sensor 104, 104' that the elevator car 202 is moving. In case the monitoring unit 120 detects by means of the at least one actuation sensor 104, 104' that the elevator car 202 is not moving, it defines that the elevator system 200 is not responding to the remote elevator command in the expected manner. In response to a definition that the elevator system 200 is not responding to the remote command in expected manner, the monitoring unit 102 may be further configured to generate at least one second signal indicating that the elevator system is out-of-operation state to the external computing entity 108. The capability of the system 100 to generate remote elevator command enables a verification of the detection of the out-of-operation state of an elevator system 200 based on the signalization traffic data together with the actuation output data described above.

Figure 4:
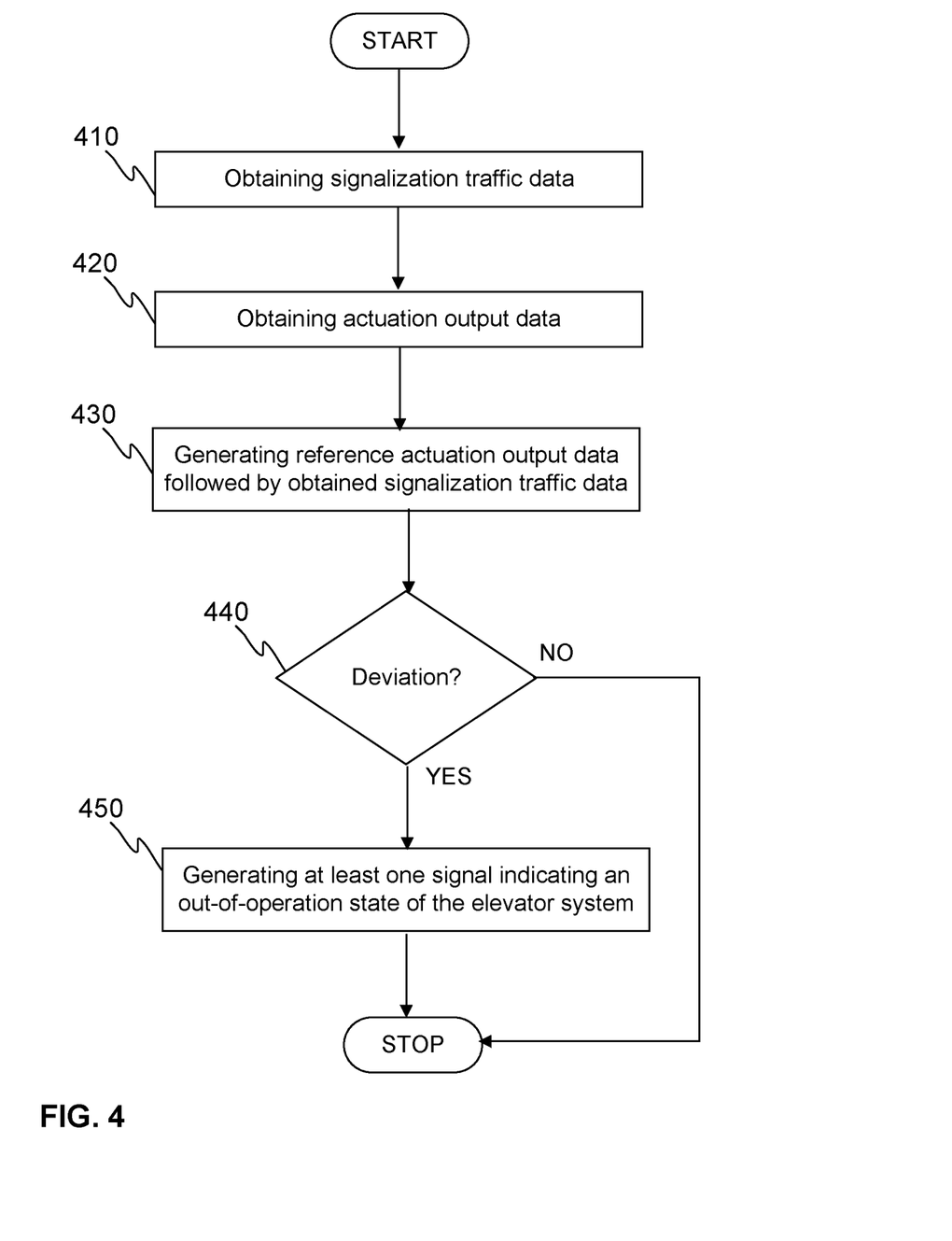
FIG. 4 illustrates schematically an example of a method according to the invention.

Above the invention is described relating to the system 100 according to the invention. Next an example of a method for detecting an out-of-operation state of an elevator system according to the invention is described by referring to FIG. 4, which illustrates schematically the invention as a flow chart. At the step 410, the signalization sensor unit 106 obtains the signalization traffic data of the at least one control system bus of the elevator system 200 and provides the obtained signalization traffic data to the monitoring unit 102. The at least one control system bus of the elevator system 200 that may be a serial communication bus type and/or a parallel communication type as discussed above. At the step 420, the at least one actuation sensor device 104, 104' obtains the actuation output data of at least one actuator entity of the elevator system 200 followed by the obtained signalization traffic data. The at least one actuator entity of the elevator system 200 may comprise elevator car 202; elevator door, e.g. landing door 216a-216n or elevator car door 212; hoisting system 204; door control unit; and/or elevator car lighting system as discussed above. At the step 430, the monitoring unit 102 generates reference actuation output data followed by the obtained signalization traffic data by applying a machine learning module as discussed above. At the step 450, the monitoring unit 102 generates at least one signal indicating an out-of-operation state of the elevator system 200 to the external computing entity 108, in response to a detection of a deviation between the obtained actuation output data and the generated reference actuation output data at the step 440 as discussed above.

Figure 5:
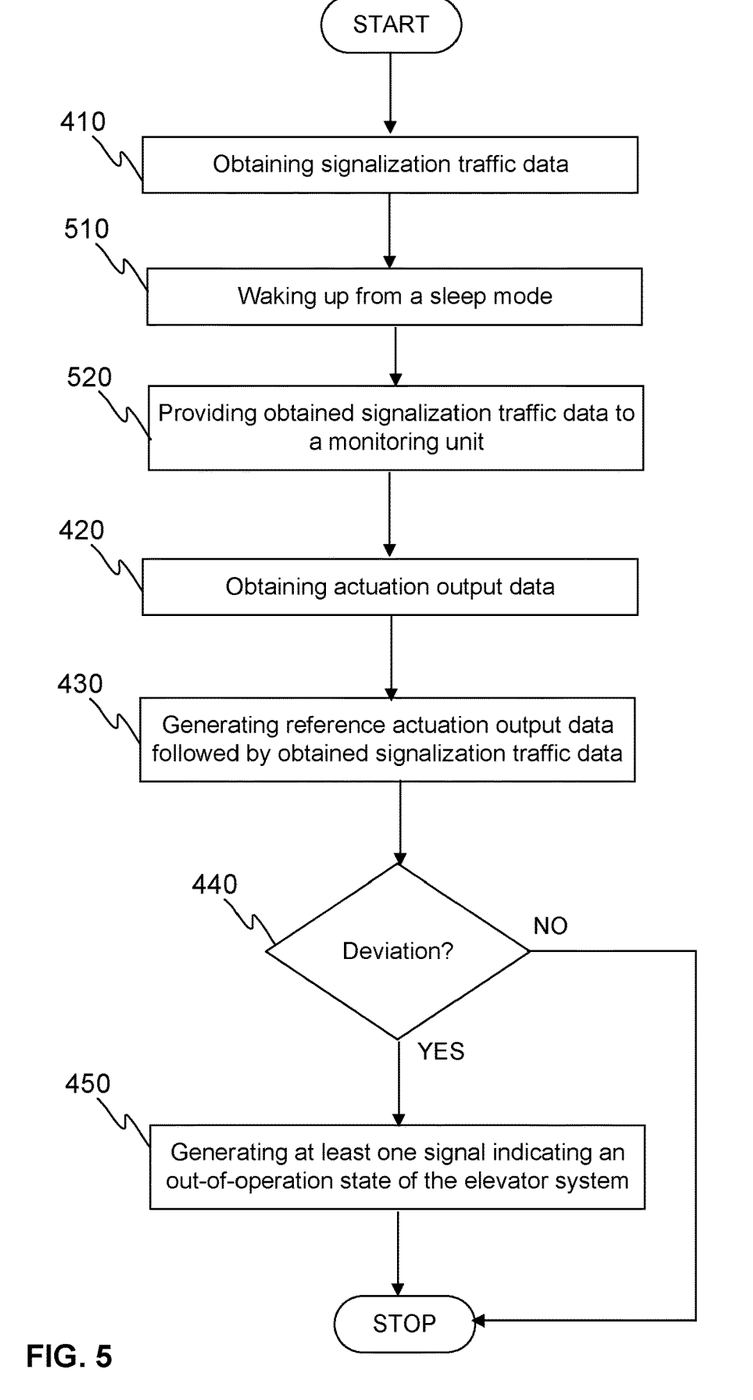
FIG. 5 illustrates schematically another example of a method according to the invention.

FIG. 5 illustrates schematically another example of a method according to the invention. At the step 510, the signalization sensor unit 106 wakes up from a sleep mode in response to obtaining the signalization traffic data by the parallel detection device 304 or the one or more serial detection devices 312a-312n of the signalization sensor unit 106 at the step 410. At the step 520, the signalization sensor unit 106 provides the obtained signalization traffic data to the monitoring unit 102 and the signalization sensor unit 106 goes back to sleep mode. After providing the obtained signalization traffic data to the monitoring unit 102, the method continues from the step 420 as described above referring to FIG. 4.

The method according the invention may further comprise providing, by the monitoring unit 102, a remote command request to the signalization sensor unit 106 to generate a remote command for controlling at least one actuation output of at least one actuation entity of the elevator system as discussed above. The monitoring unit 102 may further monitor the actuation output of the at least one actuation device of the elevator system 102 to define whether the elevator system 200 is responding to the remote command in expected manner, e.g. by comparing the monitored response to a reference response as discussed above. In response to the definition that the elevator system 200 is not responding to the remote command in expected manner, the monitoring unit 102 may further generate at least one second signal indicating that the elevator system is out-of-operation state to the external computing entity 108.

FIG. 6 schematically illustrates an example of components of the monitoring unit 102 according to the invention. The monitoring unit 102 may comprise a processing unit 610 comprising one or more processors, a memory unit 620 comprising one or more memories, a communication unit 640 comprising one or more communication devices, one or more sensor devices 650, 104' and possibly a user interface (UI) unit 660. The mentioned elements of may be communicatively coupled to each other with e.g. an internal bus. The one or more processors of the processing unit 610 may be any suitable processor for processing information and control the operation of the monitoring unit 102, among other tasks. The memory unit 620 may store portions of computer program code 625, the machine learning module, i.e. machine learning model, 630, and any other data, and the processing unit 610 may cause the monitoring unit 120 to operate as described by executing at least some portions of the computer program code 625 stored in the memory unit 620.

Furthermore, the one or more memories of the memory unit 620 may be volatile or non-volatile. Moreover, the one or more memories are not limited to a certain type of memory only, but any memory type suitable for storing the described pieces of information may be applied in the context of the invention. The communication unit 640 may be based on at least one known communication technologies, either wired or wireless, in order to exchange pieces of information as described earlier. The communication unit 640 provides an interface for communication with any external unit, such as the at least one external actuation sensor device 104 the signalization sensor unit 106, the elevator control system 210, the external computing entity 108, database and/or any external systems. The communication unit 640 may comprise one or more communication devices, e.g. radio transceiver, antenna, etc. As discussed above the communication unit 640 may be preferably based on one or more medium-range wireless radio frequency technologies, e.g. sub-gigahertz frequency technologies, in order to communicate with the signalization sensor unit 106. The sub-gigahertz frequency technology may be LoRa or any other sub-gigahertz frequency technologies. The one or more sensor devices 650 may comprise the internal at least one actuation sensor device 104', and/or any other sensor devices, e.g. pressure sensor, temperature sensor, microphone, current sensor, etc., for detecting at least one operation of the elevator system 200 and/or for providing the operational data of the elevator system 200. The user interface 660 may comprise I/O devices, such as buttons, keyboard, touch screen, microphone, loudspeaker, display and so on, for receiving input and outputting information. The power for the monitoring unit 102 may be provided from the mains via a plug or similar. Alternatively or in addition, the monitoring unit 102 may comprise a rechargeable battery for providing power to enable battery operated monitoring unit, for example in power failure situations.

The signalization sensor unit 106 and/or the monitoring unit 102 may be implemented in any elevator system including newly installed elevator systems and already existing, i.e. operating, elevator systems. The signalization sensor unit 106 may be retrofitted to an existing elevator system and may be completely independent of the existing elevator system. In other words, the signalization sensor unit 106 may be arranged to already existing elevator system without communicatively coupling the signalization sensor unit 106 to one or more entities, e.g. control units, of the existing elevator system. The sensor unit 104 may be only mechanically installed in a physical connection with the elevator system as discussed above. Alternatively or in addition, the monitoring unit 102 and/or the at least one actuation sensor device 104, 104' may be retrofitted to an existing elevator system and may be completely independent of the existing elevator system. In other words, the monitoring unit 102 and/or the at least one actuation sensor device 104, 104' may be arranged to already existing, i.e. operating, elevator system without communicatively coupling the monitoring unit 102 and/or the at least one actuation sensor device 104, 104' to one or more entities, e.g. control units, of the existing elevator system. The monitoring unit 102 and/or the at least one actuation sensor device 104, 104' may be only mechanically coupled in physical connection with the elevator system as discussed above. This enables that the system 100 according to the invention may be implemented in a newly installed elevator system or in already existing elevator system. By implementing the system 100 according to the invention in already existing elevator system monitoring of condition of already existing elevator system is enabled. Moreover, it enables that the whole system 100, the at least one actuation sensor device 104, 104' the signalization sensor unit 106, and/or the monitoring unit 102 according to the invention do not have any requirements to the elevator system. Because the system 100 comprising the signalization sensor unit 106, the at least one actuation sensor device 104, 104' and/or the monitoring unit 102 are completely independent of the elevator system, it enables that the system 100 is substantially easy to install to the elevator system 200.

The above described system and method for detecting an out-of-operation state of an elevator system improve at least partly reliability of monitoring of the condition the elevator system. Moreover, the system and method according to the invention may be implemented in any newly built or existing elevator system irrespective of manufacturer of the elevator system.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A system for detecting an out-of-operation state of an elevator system, the system comprising:
a signalization sensor unit configured to obtain signalization traffic data of at least one control system bus arranged between an elevator control system of the elevator system and at least one of a car operating panel, landing call devices, a hoisting motion control system, a door control unit, or an elevator group control system,
at least one actuation sensor device configured to obtain actuation output data of at least one actuator entity of the elevator system followed by the obtained signalization traffic data,
an external computing entity, and
a monitoring unit configured to:
generate reference actuation output data followed by the obtained signalization traffic data by applying a machine learning module stored in a memory unit of the monitoring unit, wherein the machine learning module is configured to receive the obtained signalization traffic data as its input data and to generate the reference actuation output data as the output data of the machine learning module by applying one or more machine learning techniques, and
generate a signal indicating an out-of-operation state of the elevator system to an external computing entity, in response to a detection of a deviation between the obtained output data and the generated reference output data.

2. The system according to claim 1, wherein the at least one actuator entity of the elevator system comprises elevator car, elevator door, hoisting system, the door control unit, and/or elevator car lighting system.

3. The system according to claim 2, wherein the signalization sensor unit comprises one or more series detection devices for obtaining the signalization traffic data from a serial communication bus type control system bus.

4. The system according to claim 2, wherein the signalization sensor unit comprises parallel detection device for obtaining the signalization traffic data from a parallel communication type control system bus.

5. The system according to claim 2, wherein the signalization sensor unit is configured to: wake up from a sleep mode in response to obtaining the signalization traffic data, provide the obtained signalization traffic data to the monitoring unit, and go back to sleep mode.

6. The system according to claim 1, wherein the signalization sensor unit comprises one or more series detection devices for obtaining the signalization traffic data from a serial communication bus type control system bus.

7. The system according to claim 6, wherein the signalization sensor unit comprises parallel detection device for obtaining the signalization traffic data from a parallel communication type control system bus.

8. The system according to claim 6, wherein the signalization sensor unit is configured to: wake up from a sleep mode in response to obtaining the signalization traffic data, provide the obtained signalization traffic data to the monitoring unit, and go back to sleep mode.

9. The system according to claim 1, wherein the signalization sensor unit comprises parallel detection device for obtaining the signalization traffic data from a parallel communication type control system bus.

10. The system according to claim 9, wherein the signalization sensor unit is configured to: wake up from a sleep mode in response to obtaining the signalization traffic data, provide the obtained signalization traffic data to the monitoring unit, and go back to sleep mode.

11. The system according to claim 1, wherein the signalization sensor unit is configured to: wake up from a sleep mode in response to obtaining the signalization traffic data, provide the obtained signalization traffic data to the monitoring unit, and go back to sleep mode.

12. The system according to claim 1, wherein the monitoring unit is further configured to provide a remote command request to the signalization sensor unit to generate a remote command for controlling at least one actuation output of at least one actuator entity of the elevator system.

13. The system according to claim 1, wherein historical output data of at least one actuator entity of the elevator system gathered with the at least one actuation sensor device and historical traffic data of at least one elevator control system bus gathered with the signalization sensor unit are used as training data to train the machine learning module.

14. A method for detecting an out-of-operation state of an elevator system, the method comprising:
   obtaining, by a signalization sensor unit, signalization traffic data of at least one control system bus of the elevator system and at least one of a car operating panel, landing call devices, a hoisting motion control system, a door control unit, or an elevator group control system,
   obtaining, by at least one actuation sensor device, actuation output data of at least one actuator entity of the elevator system followed by the obtained signalization traffic data,
   generating, by a monitoring unit, reference actuation output data followed by the obtained signalization traffic data by applying a machine learning module, wherein the generating the reference actuation output data comprises receiving the obtained signalization traffic data as input data of the machine learning module and generating the reference actuation output data as the output data of the machine learning module by applying one or more machine learning techniques, and
   generating, by the monitoring unit, a signal indicating an out-of-operation state of the elevator system to an external computing entity, in response to a detection of a deviation between the obtained actuation output data and the generated reference actuation output data.

15. The method according to claim 14, wherein the at least one actuator of the elevator system comprises elevator car, elevator door, hoisting system, the door control unit, and/or elevator car lighting system.

16. The method according to claim 14, further comprising:
   waking up the signalization sensor unit from a sleep mode in response to obtaining the signalization traffic data,
   providing the obtained signalization traffic data to the monitoring unit, and going back to sleep mode.

17. The method according to claim 14, further comprising:
   providing, by the monitoring unit, a remote command request to signalization sensor unit to generate a remote command for controlling at least one actuation output of at least one actuation entity of the elevator system.

18. The method according to claim 14, comprising:
   gathering historical actuation output data of at least one actuator entity of the elevator system with the at least one actuation sensor device,
   gathering historical signalization traffic data of at least one elevator control system bus with signalization sensor unit, and
   using the gathered historical output data and historical traffic data as training data to train the machine learning module.

* * * * *